(12) United States Patent
Butsusaka et al.

(10) Patent No.: US 8,886,257 B2
(45) Date of Patent: Nov. 11, 2014

(54) ELECTRONIC DEVICE

(71) Applicant: Fujitsu Limited, Kawasaki (JP)

(72) Inventors: Tomohiro Butsusaka, Kawasaki (JP); Kei Kojima, Kawasaki (JP); Chikara Kobayashi, Kato (JP); Masahiko Ina, Kato (JP); Shigehiro Fujii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 31 days.

(21) Appl. No.: 13/867,597

(22) Filed: Apr. 22, 2013

(65) Prior Publication Data

US 2013/0331150 A1 Dec. 12, 2013

(30) Foreign Application Priority Data

Jun. 11, 2012 (JP) .................................. 2012-132338

(51) Int. Cl.
*H04B 1/38* (2006.01)
*G06F 1/16* (2006.01)
*G06F 3/041* (2006.01)

(52) U.S. Cl.
CPC ............ *H04B 1/3888* (2013.01); *G06F 1/1643* (2013.01); *G06F 3/041* (2013.01); *G06F 1/1626* (2013.01)

USPC ......... 455/566; 455/550.1; 345/173; 345/105

(58) Field of Classification Search
USPC ................ 455/566, 550.1; 345/173, 104, 105
See application file for complete search history.

(56) References Cited

U.S. PATENT DOCUMENTS

| | | | |
|---|---|---|---|
| 2009/0174832 A1* | 7/2009 | Lee | ................................. 349/43 |
| 2010/0231422 A1 | 9/2010 | Inaba et al. | |
| 2011/0102342 A1* | 5/2011 | Iwawaki et al. | ............... 345/173 |

FOREIGN PATENT DOCUMENTS

JP 2010-218136 A 9/2010

* cited by examiner

*Primary Examiner* — Khalid Shaheed
(74) *Attorney, Agent, or Firm* — Westerman, Hattori, Daniels & Adrian, LLP

(57) ABSTRACT

An electronic device includes a housing, a display module, and a touch panel. On the housing, an opening is formed. The display module is fixed to the inside of the housing in such a way that a display surface faces the side of the opening. The touch panel is placed to be opposed to the display surface of the display module via a first elastic member placed on the display surface of the display module, and is fixed to the housing via a second elastic member placed on the housing. Hardness of the first elastic member is higher than that of the second elastic member.

4 Claims, 4 Drawing Sheets

ELECTRONIC DEVICE

CROSS-REFERENCE TO RELATED APPLICATION(S)

This application is based upon and claims the benefit of priority of the prior Japanese Patent Application No. 2012-132338, filed on Jun. 11, 2012, the entire contents of which are incorporated herein by reference.

FIELD

The embodiment discussed herein is related to an electronic device.

BACKGROUND

In recent years, touch-panel electronic devices that display various images, such as a text, a photo, a graphic, and a chart, on a panel and allow various operations by touch input to the panel have become popular. The touch-panel electronic devices include, for example, a cellular phone (smartphone), a tablet personal computer (PC), and the like.

More specifically, such an electronic device includes a housing of which the one side is open and a liquid crystal display (LCD) module fixed to the inside of the housing in such a way that a display surface faces to the open side of the housing. The electronic device further includes a touch panel placed so as to be opposed to the LCD module and fit into the open side of the housing.

Elastic dust-proof packing for preventing the intrusion of dust into the LCD module is placed on an outer peripheral part of a side on the side opposite to the touch panel of the LCD module. Furthermore, a flange projecting from an end face of the opening of the housing toward the inside of the opening is formed, and an elastic double-sided tape is attached to the flange. The touch panel is placed to be opposed to the LCD module via the dust-proof packing, and is fixed to the housing via the double-sided tape. An example of conventional technology may be found in Japanese Laid-open Patent Publication No. 2010-218136.

However, the structure of the conventional electronic device is not designed for improving the tracking performance with respect to a pressing operation on the touch panel.

Namely, the dust-proof packing attached to an outer peripheral part of the LCD module is generally made of a relatively-soft material, so the dust-proof packing has a low spring constant and a high (viscoelastic) damping effect. Therefore, when a pressing operation is performed on the touch panel, and the whole touch panel bends, and, after that, the pressing is released, the touch panel may be slow to return to the original position. As a result, for example, when continuous pressing operations are performed on the touch panel, the tracking performance with respect to a pressing operation may be decreased.

SUMMARY

According to an aspect of an embodiment, an electronic device includes a housing, a display module, and a touch panel. On the housing, an opening is formed. The display module is fixed to the inside of the housing in such a way that a display surface faces the side of the opening. The touch panel is placed to be opposed to the display surface of the display module via a first elastic member placed on the display surface of the display module, and is fixed to the housing via a second elastic member placed on the housing. Hardness of the first elastic member is higher than that of the second elastic member.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A preferred embodiment of the present invention will be explained with reference to accompanying drawings. Incidentally, the present invention is not limited to the embodiment. For example, in the embodiment described below, a cellular phone (smartphone) is explained as an example of the electronic device; however, the electronic device is not limited to the cellular phone.

Figure 1:
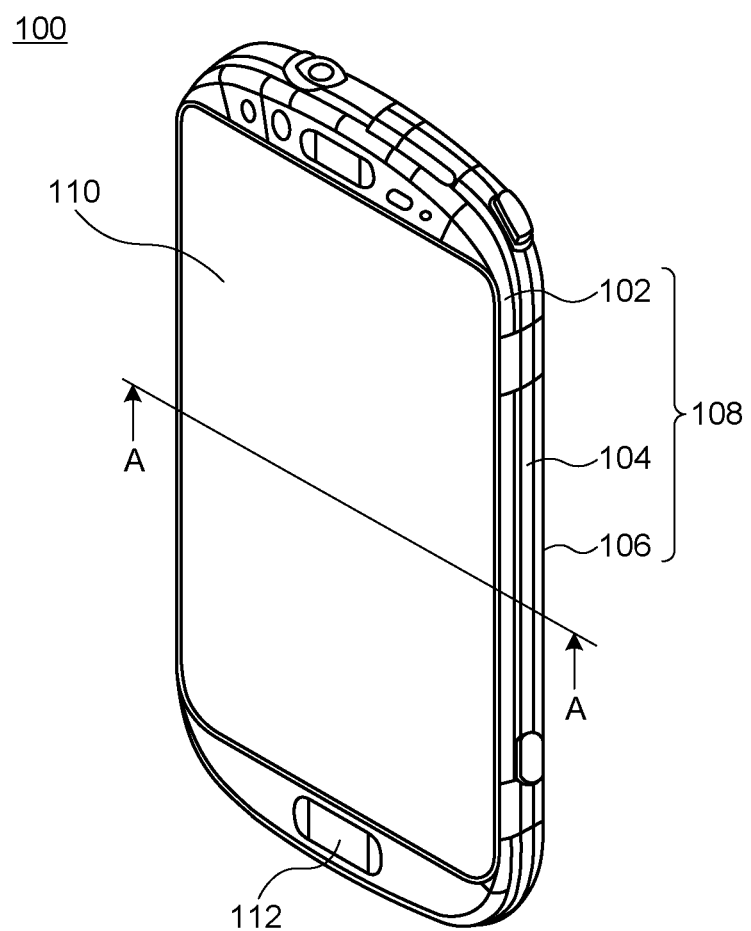
FIG. 1 is a perspective view illustrating the appearance of a cellular phone according to a present embodiment.
Figure 2:
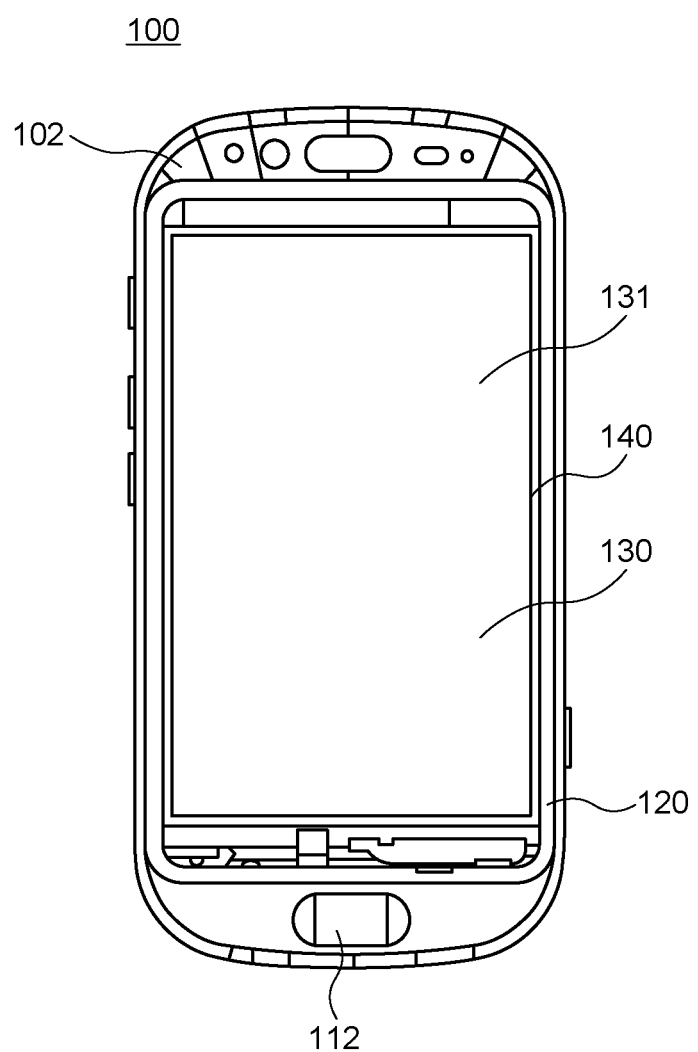
FIG. 2 is a plan view illustrating the appearance of the cellular phone according to the present embodiment in a state where a touch panel is removed from the cellular phone.
Figure 3:
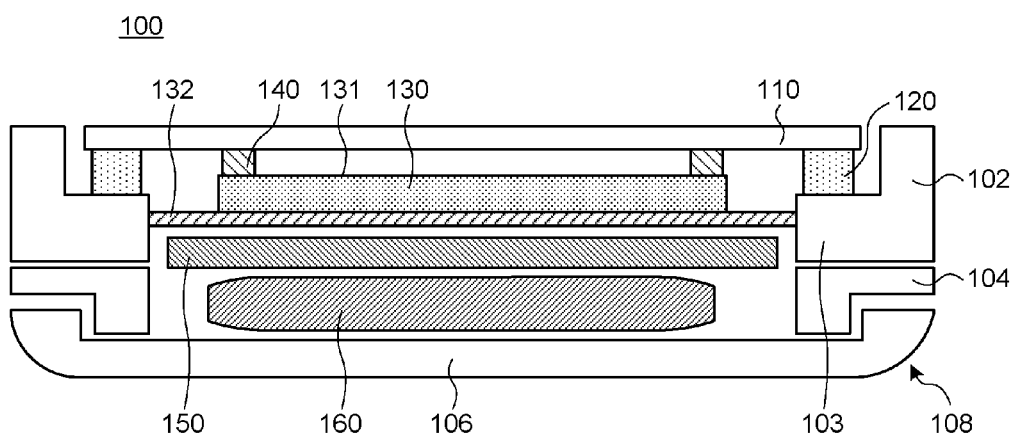
FIG. 3 is a longitudinal cross-sectional view of the cellular phone along a line A-A illustrated in FIG. 1.

FIG. 1 is a perspective view illustrating the appearance of a cellular phone according to the present embodiment. FIG. 2 is a plan view illustrating the appearance of the cellular phone according to the present embodiment in a state where a touch panel is removed from the cellular phone. FIG. 3 is a longitudinal cross-sectional view of the cellular phone along a line A-A illustrated in FIG. 1.

As illustrated in FIGS. 1 to 3, a cellular phone 100 according to the present embodiment includes a housing 108 of which the one side is open; the housing 108 is formed by a combination of a front case 102, a rear case 104, and a rear cover 106. The front case 102 is formed into, for example, a frame-like shape. The rear case 104 is formed into, for example, a frame-like shape corresponding to the front case 102, and is combined with the front case 102. The rear cover 106 is formed so as to cover an opening on the back side formed by the rear case 104, and is combined with the rear case 104. In an opening of the housing 108 formed by the front case 102, a plate-like touch panel 110 is placed so as to fit into the open side of the housing 108. An operation key 112 for performing a predetermined operation on the cellular phone 100 is placed below the touch panel 110.

In the housing 108, for example, as illustrated in FIGS. 2 and 3, a metal plate 132 fixed to the front case 102, an LCD module 130 fixed on the metal plate 132, a printed circuit board 150, and a battery 160, etc. are housed. Incidentally, besides the above, various parts of the cellular phone 100 are housed in the housing 108.

As illustrated in FIGS. 2 and 3, the LCD module 130 is placed in the housing 108 in such a way that a display surface 131 faces to the open side of the housing 108. The LCD module 130 is fixed to the housing 108 via the metal plate 132 fixed to the inside of the housing 108. Furthermore, on an outer peripheral part of the display surface 131 of the LCD module 130, frame-like dust-proof packing 140 is placed along the outer periphery of the LCD module 130. The dust-proof packing 140 has elasticity, and have functions of supporting the touch panel 110 on the LCD module 130 and preventing the intrusion of dust or the like from the outside into the LCD module 130. The dust-proof packing 140 is made of, for example, an urethane material or a rubber material.

On the front case 102, a flange 103 projecting toward the inside of the opening of the housing 108 is formed. Then, a double-sided tape 120 is attached to the flange 103 on the side of the opening of the housing 108. The double-sided tape 120 is placed like a frame at a position on the outer peripheral side than the dust-proof packing 140, and has elasticity. The double-sided tape 120 has a function of attaching the touch panel 110 to the front case 102. The double-sided tape 120 is made of an acrylic material or a silicon material.

An outer peripheral part of the touch panel 110 is attached to the front case 102 by the double-sided tape 120, and a part of the touch panel 110 on the inner peripheral side than the outer peripheral part is supported on the LCD module 130 by the dust-proof packing 140. When the touch panel 110 being in an initial state (an original position) is pressed with user's finger or the like, the pressed portion bends, and a distance to the LCD module 130 changes. The touch panel 110 is a device that detects a position pressed with user's finger or the like according to a change in the distance to the LCD module 130.

Here, how soon the touch panel 110 returns to the initial state when the touch panel 110 being in the pressed state is released from pressing force is explained.

Figure 4:
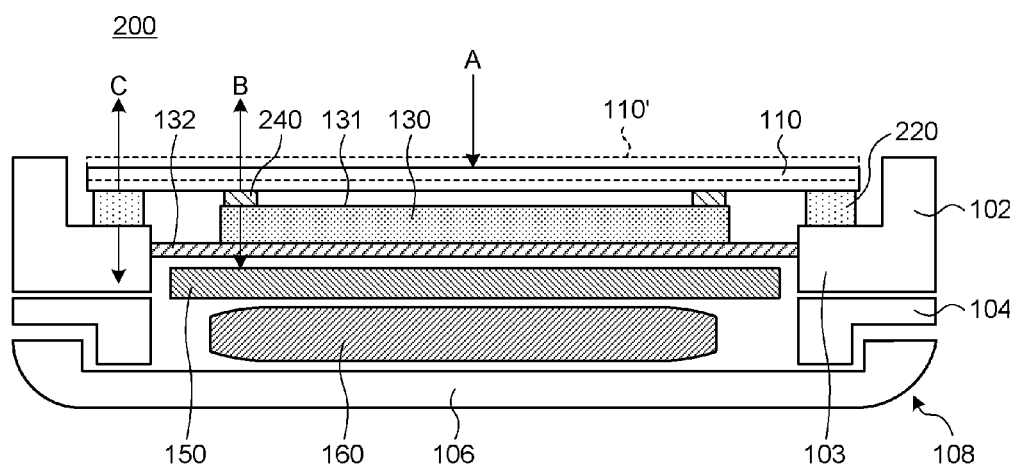
FIG. 4 is a longitudinal cross-sectional view of a cellular phone according to a comparative example in a state where a touch panel is being pressed.

First, as a comparative example, a cellular phone using general dust-proof packing and double-sided tape is explained. FIG. 4 is a longitudinal cross-sectional view of a cellular phone according to one comparative example in a state where a touch panel is being pressed. A cellular phone 200 according to the comparative example differs in materials of dust-proof packing and double-sided tape from the cellular phone 100 according to the present embodiment, and the other parts are similar to those in the cellular phone 100 according to the present embodiment. In FIG. 4, similar parts to those in the present embodiment are denoted by the same reference numerals. Incidentally, in FIG. 4, a dashed line 110' indicates a position of the touch panel 110 in the initial state where no pressing force is applied to the touch panel 110.

Dust-proof packing 240 used in the cellular phone 200 is commonly-used one, and is made of a relatively-low hardness (soft) and low spring constant material. Therefore, as illustrated in FIG. 4, when pressing force A is applied to the touch panel 110, the overall touch panel 110 bends and deforms from the initial position of the touch panel 110 indicated by the dashed line 110'. At this time, as illustrated in FIG. 4, the dust-proof packing 240 is subjected to stress B, and a double-sided tape 220 is subjected to stress C. Here, the balancing of the forces is that the pressing force A equals the stress B plus the stress C.

From this state, the pressing force A is released. Then, the touch panel 110 returns to the initial position indicated by the dashed line 110'. However, the dust-proof packing 240 is made of the relatively-low hardness (soft) and low spring constant material, so stress to return the touch panel 110 to the initial position is low, and the (viscoelastic) damping effect is high; therefore, it takes a relatively long time for the touch panel 110 to return to the initial position. Consequently, for example, when continuous pressing operations are performed on the touch panel 110, the pressing operations is not correctly recognized, and thus, the tracking performance with respect to a pressing operation may be decreased.

Figure 5:
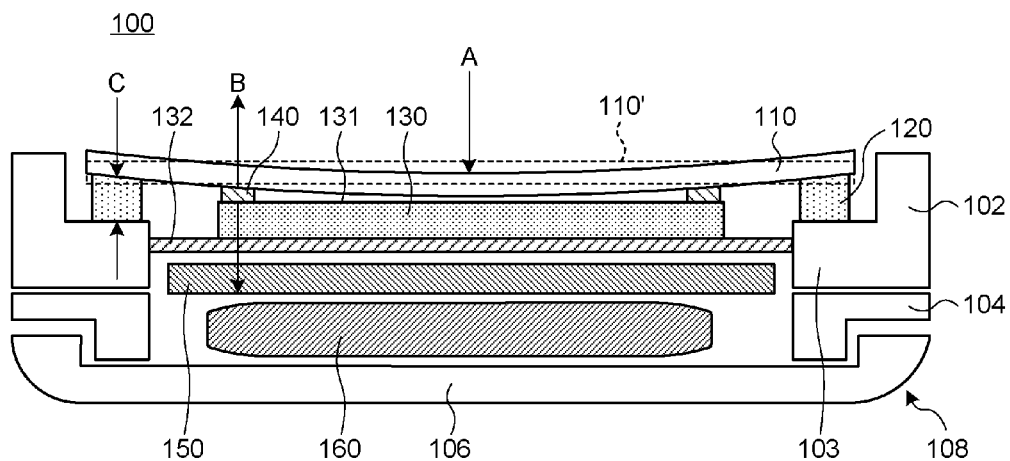
FIG. 5 is a longitudinal cross-sectional view of the cellular phone according to the present embodiment in a state where the touch panel is being pressed.
Figure 6:
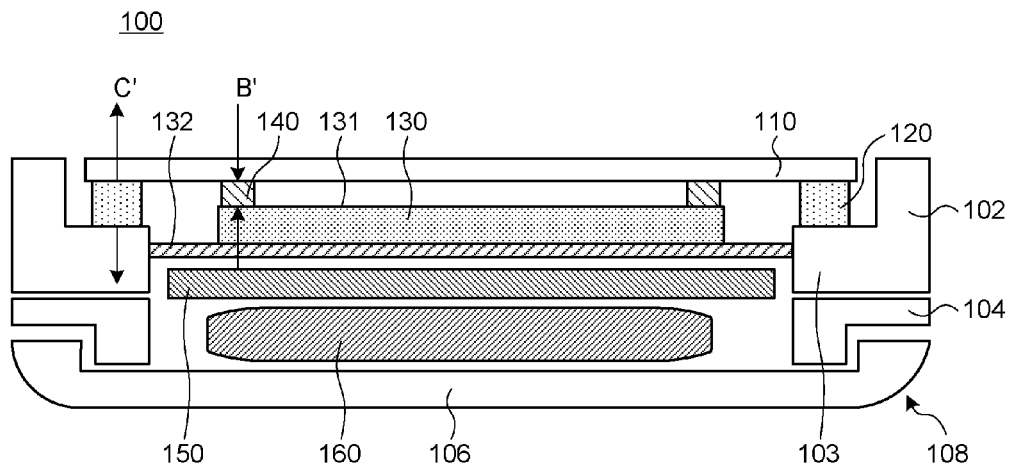
FIG. 6 is a longitudinal cross-sectional view of the cellular phone according to the present embodiment in a state where the touch panel is released from the pressing.

On the other hand, the cellular phone 100 according to the present embodiment is explained. FIG. 5 is a longitudinal cross-sectional view of the cellular phone according to the present embodiment in a state where the touch panel is being pressed. FIG. 6 is a longitudinal cross-sectional view of the cellular phone according to the present embodiment in a state where the touch panel is released from the pressing. Incidentally, in FIG. 5, a dashed line 110' indicates the position of the touch panel 110 in the initial state where no pressing force is applied to the touch panel 110.

First, the dust-proof packing 140 of the cellular phone 100 according to the present embodiment is made of a relatively-high hardness (hard) and high spring constant material, such as an urethane material or a rubber material, as described above. For example, when the hardness of the dust-proof packing 240 in the cellular phone 200 according to the comparative example is denoted by "D", and the hardness of the dust-proof packing 140 in the cellular phone 100 according to the present embodiment is denoted by "E", a relation of D<E holds. Furthermore, the double-sided tape 120 is made of, for example, an acrylic material or a silicon material. Therefore, in the present embodiment, when the hardness of the dust-proof packing 140 is denoted by "E", and the hardness of the double-sided tape 120 is denoted by "F", a relation of E>F holds.

Consequently, as illustrated in FIG. 5, when pressing force A is applied to the touch panel 110, the center of the touch panel 110 sags, and the touch panel 110 greatly bends and deforms from the initial position of the touch panel 110 indicated by the dashed line 110'. At this time, as the dust-proof packing 140 is relatively high in hardness, the dust-proof packing 140 is subjected to high stress B as illustrated in FIG. 5. On the other hand, as the double-sided tape 120 is lower in hardness than the dust-proof packing 140, the double-sided tape 120 extends and deforms from the initial state, and is subjected to stress C as illustrated in FIG. 5. Here, the balancing of the forces is that the pressing force A equals the stress B plus the stress C.

From this state, the pressing force A is released. Then, the touch panel 110 returns to the initial position indicated by the dashed line 110'. As the dust-proof packing 140 is made of the relatively-high hardness (hard) and high spring constant material, the stress B to return the touch panel 110 to the initial position greatly acts on the dust-proof packing 140. In addition to this, force to contract the double-sided tape 120 from the extended state to the initial state (the stress C) acts on the double-sided tape 120.

When the pressing force A is released, as illustrated in FIG. 6, by the stresses on the dust-proof packing 140 and the double-sided tape 120, the touch panel 110 quickly returns to the initial position in a relatively short time. Incidentally, immediately after the release of the pressing force A, as illustrated in FIG. 6, the touch panel 110 is subjected to stress B' by a reaction to the extension of the dust-proof packing 140, and is subjected to stress C' by a reaction to the contraction of the double-sided tape 120. Here, the balancing of the stresses is B'=C', so the touch panel 110 quickly returns to the initial position and stands still. Consequently, for example, when continuous pressing operations are performed on the touch panel 110, the pressing operations are correctly recognized, and therefore, it is possible to improve the tracking performance with respect to a pressing operation.

As described above, in the present embodiment, the dust-proof packing 140 having a sufficiently-high spring constant and high hardness is used, and the double-sided tape 120 having a sufficiently-low spring constant and low hardness is used. Consequently, when pressing force is applied to the touch panel 110, force in a direction to contract the extended double-sided tape 120 acts on the outer peripheral part (the part to which the double-sided tape 120 is attached) of the touch panel 110; in contrast, relatively-great force in a direction to extend the compressed dust-proof packing 140 acts on the part supported by the dust-proof packing 140 on the inner side of the outer peripheral part of the touch panel 110. Therefore, in the present embodiment, a spring constant that spring constants of the dust-proof packing 140 and the double-sided tape 120 are combined can be set high, and thus, the touch panel 110 can quickly return to the initial position in a relatively short time. As a result, according to the present embodiment, for example, when continuous pressing operations are performed on the touch panel 110, the pressing operations are correctly recognized, and therefore, it is possible to improve the tracking performance with respect to a pressing operation.

Furthermore, according to the present embodiment, the dust-proof packing 140 having a sufficiently-high spring constant and high hardness is used; therefore, in the initial state where a user is not pressing the touch panel 110, it is possible to prevent a distance between the touch panel 110 and the LCD module 130 from varying due to vibration or the like. As a result, according to the present embodiment, it is possible to prevent false detection by the touch panel 110 due to vibration or the like.

According to an embodiment, it is possible to improve the tracking performance with respect to a pressing operation on the touch panel.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:
1. An electronic device comprising:
a housing on which an opening is formed;
a display module that is fixed to an inside of the housing in a way that a display surface faces a side of the opening; and
a touch panel that is placed to be opposed to the display surface of the display module via a first elastic member placed on the display surface of the display module, and is fixed to the housing via a second elastic member placed on the housing, wherein
hardness of the first elastic member is higher than that of the second elastic member.
2. The electronic device according to claim 1, wherein the first elastic member is placed on an outer peripheral part of the display surface of the display module.
3. The electronic device according to claim 1, wherein the second elastic member is placed on a flange projecting from an end face of the opening of the housing toward an inside of the opening.
4. The electronic device according to claim 1, wherein the first elastic member is made of an urethane material or a rubber material, and
the second elastic member is a double-sided tape made of an acrylic material or a silicon material.

\* \* \* \* \*